United States Patent
Chang et al.

(10) Patent No.: US 9,983,662 B2
(45) Date of Patent: May 29, 2018

(54) WAKE-UP AND PHYSICAL BUTTON FUNCTION ADJUSTING METHOD AND ELECTRONIC DEVICE USING THE SAME

(71) Applicant: Wistron Corporation, New Taipei (TW)

(72) Inventors: Yung-Yen Chang, New Taipei (TW); Chia-Jen Shu, New Taipei (TW)

(73) Assignee: Wistron Corporation, New Taipei (TW)

( * ) Notice: Subject to any disclaimer, the term of this patent is extended or adjusted under 35 U.S.C. 154(b) by 386 days.

(21) Appl. No.: 14/146,736

(22) Filed: Jan. 3, 2014

(65) Prior Publication Data
US 2015/0088278 A1    Mar. 26, 2015

(30) Foreign Application Priority Data

Sep. 24, 2013 (TW) .............................. 102134303 A (51) Int. Cl.
*G05B 19/04* (2006.01)
*G06F 3/00* (2006.01)

(52) U.S. Cl.
CPC ...... *G06F 3/00* (2013.01); *G05B 2219/23018* (2013.01); *G05B 2219/23316* (2013.01)

(58) Field of Classification Search
CPC .......... G05B 19/04; G05B 2219/23316; G05B 2219/23018; G05B 2219/25279;
(Continued)

(56) References Cited

U.S. PATENT DOCUMENTS

| | | | | |
|---|---|---|---|---|
| 6,004,049 A | * | 12/1999 | Knox .................... | G06F 3/0238 400/472 |
| 6,014,092 A | * | 1/2000 | Darbee .................. | G08C 19/28 340/12.28 |

(Continued)

FOREIGN PATENT DOCUMENTS

| | | |
|---|---|---|
| TW | 200941199 | 10/2009 |
| TW | 201119341 | 6/2011 |

(Continued)

OTHER PUBLICATIONS

Bikerumor, "Wahoo_Fitness—RFLKT_bluetooth_cycling_computer", Youtube.com Sep. 24, 2012, pp. 2.*
(Continued)

*Primary Examiner* — Miranda Huang
*Assistant Examiner* — Olvin Lopez Alvarez
(74) *Attorney, Agent, or Firm* — JCIPRNET (57) ABSTRACT

An electronic device including a physical button, a processing unit and a sensing unit is provided. The processing unit is coupled to the physical button and the sensing unit is coupled to the processing unit. When the electronic device enters a hibernation mode or in a shutdown state, the sensing unit continuously detects a wake-up signal. When receiving the wake-up signal, the sensing unit wakes up the processing unit. The sensing unit further receives an instruction signal externally, generates an instruction information according to the instruction signal, and sends the instruction information to the processing unit. When receiving the instruction information, the processing unit adjusts a corresponding function of the physical button according to the instruction information.

24 Claims, 2 Drawing Sheets

(58) Field of Classification Search
CPC ........... G05B 2219/25286; G05B 2219/25289; G06F 3/00; G06F 9/4418
USPC ........... 700/12, 40; 73/861; 455/343.1–343.2
See application file for complete search history.

(56) References Cited

U.S. PATENT DOCUMENTS

| | | | | |
|---|---|---|---|---|
| 6,356,965 | B1* | 3/2002 | Broyles | G06F 9/4416 709/220 |
| 6,526,335 | B1* | 2/2003 | Treyz | G01C 21/26 307/10.1 |
| 6,879,351 | B1* | 4/2005 | Brown | H04N 5/4403 340/12.53 |
| 6,882,859 | B1* | 4/2005 | Rao | G06F 3/023 345/168 |
| 7,746,230 | B2* | 6/2010 | Tuttle | G01S 13/758 235/490 |
| 8,890,664 | B2* | 11/2014 | Edwards | G08C 19/28 340/12.22 |
| 2003/0103088 | A1* | 6/2003 | Dresti | G06F 3/0481 715/835 |
| 2005/0048929 | A1* | 3/2005 | Ogino | G08C 17/00 455/90.1 |
| 2006/0068750 | A1* | 3/2006 | Burr | H04W 52/0225 455/343.1 |
| 2006/0148464 | A1* | 7/2006 | Dunko | H04M 1/6091 455/419 |
| 2006/0187211 | A1* | 8/2006 | Uusitalo | G06F 3/04886 345/169 |
| 2007/0162736 | A1* | 7/2007 | Wu | G06F 9/4401 713/2 |
| 2008/0009318 | A1* | 1/2008 | Evans | H04M 3/42178 455/558 |
| 2008/0098246 | A1* | 4/2008 | Kim | G06F 1/3203 713/323 |
| 2008/0158148 | A1* | 7/2008 | Madonna | G06F 3/0482 345/156 |
| 2009/0070491 | A1* | 3/2009 | Chiu | G06F 3/0238 710/5 |
| 2009/0221363 | A1* | 9/2009 | Brunet de Courssou | G07F 17/32 463/25 |
| 2009/0240965 | A1 | 9/2009 | Chen et al. | |
| 2010/0042710 | A1* | 2/2010 | Lin | H04L 67/125 709/222 |
| 2010/0208145 | A1* | 8/2010 | VanDuyn | G08C 19/28 348/734 |
| 2010/0218012 | A1* | 8/2010 | Joseph | G06F 1/3203 713/310 |
| 2010/0298957 | A1* | 11/2010 | Sanchez Rocha | G05B 15/02 700/90 |
| 2011/0084909 | A1* | 4/2011 | Hsieh | G06F 1/1662 345/170 |
| 2011/0302436 | A1* | 12/2011 | Clark | H04W 52/0235 713/323 |
| 2012/0017161 | A1* | 1/2012 | Hirshberg | G06F 3/04886 715/763 |
| 2012/0077554 | A1* | 3/2012 | Ahn | H04W 52/027 455/574 |
| 2012/0161521 | A1 | 6/2012 | Hung | |
| 2012/0173782 | A1* | 7/2012 | Frantz | G06F 9/4418 710/267 |
| 2013/0016043 | A1* | 1/2013 | You | G06F 3/0238 345/170 |
| 2013/0336188 | A1* | 12/2013 | Yomo | H04W 52/0206 370/311 |
| 2013/0342467 | A1* | 12/2013 | Cresp | H04L 67/14 345/172 |
| 2014/0111315 | A1* | 4/2014 | Geerlings | G07C 9/00309 340/12.5 |
| 2014/0122024 | A1* | 5/2014 | Chen | G06F 11/3003 702/184 |
| 2014/0125464 | A1* | 5/2014 | Chen | G08C 19/00 340/12.54 |

FOREIGN PATENT DOCUMENTS

| | | | | |
|---|---|---|---|---|
| TW | 201227261 | | 7/2012 | |
| WO | 2012114968 | | 8/2012 | |
| WO | WO 2012114968 | * | 8/2012 | ........ H04W 52/0206 |

OTHER PUBLICATIONS

Hornick, "Review: Wahoo RFLKT is a big win for cyclists | PCWorld", Mar. 23, 2013, pp. 7.*
Rainmaker, "First look at new Wahoo Fitness RFLKT Bluetooth Smart bike computer", Sep. 19, 2012, pp. 19.*
"Office Action of Taiwan Counterpart Application," dated Jul. 22, 2015, with English translation thereof, p. 1-p. 16.
"First Office Action of China Counterpart Application" with partial English translation thereof, dated Dec. 20, 2016, p. 1-p. 25.

* cited by examiner

WAKE-UP AND PHYSICAL BUTTON FUNCTION ADJUSTING METHOD AND ELECTRONIC DEVICE USING THE SAME

CROSS-REFERENCE TO RELATED APPLICATION

This application claims the priority benefit of Taiwan application serial no. 102134303, filed on Sep. 24, 2013. The entirety of the above-mentioned patent application is hereby incorporated by reference herein and made a part of this specification.

TECHNICAL FIELD

The present invention relates to an electronic device, in particular, to an electronic device and a control method thereof.

BACKGROUND

With the evolution of technology, mobile electronic devices, such as smart phones and tablet PCs, play essential roles gradually in daily lives. For the current design trend, the mobile electronic devices like smart phones or tablet PCs usually set touch screens in order to let users operate intuitively. Only about one to three physical buttons are set and remained on the mobile electronic devices to provide controlling settings, such as booting the electronic devices or volume, for users. Nevertheless, when the mobile electronic devices are manufactured, the corresponding functions of these physical buttons have been usually preset by their manufacturers, and in general, users are incapable of randomly defining the corresponding functions of these buttons.

SUMMARY

Accordingly, the present invention is directed to an electronic device and a control method that are capable of change the corresponding function of a physical button on the electronic device when the system is in a shutdown state or in a hibernation mode.

The present invention provides an electronic device including a physical button, a processing unit and a sensing unit. The processing unit is coupled to the physical button. The sensing unit is coupled to the processing unit. Wherein, when the electronic device enters a hibernation mode or is in a shutdown state, the sensing unit continuously detects a wake-up signal. When the sensing unit receives the wake-up signal, the sensing unit wakes up the processing unit. The sensing unit receives an instruction signal externally, generates an instruction information according to the instruction signal, and sends the instruction information to the processing unit. When the processing unit receives the instruction information, the processing unit adjusts a corresponding function of the physical button according to the instruction information.

The present invention provides a control method adapted to an electronic device including a physical button. The control method includes the following steps. When the electronic device enters a hibernation mode or is in a shutdown state, a wake-up signal is detected continuously. Then, when the wake-up signal is received, an instruction signal is received, and an instruction information is generated according to the instruction signal. Additionally, a corresponding function of the physical button is adjusted according to the instruction information.

To sum up, the present invention provides an electronic device and a control method thereof that are capable of adjusting the corresponding function of the physical button on the electronic device by sending wake-up signal and instruction information when the electronic device enters the hibernation mode or is in the shutdown state.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Please trying to imagine some applied situations before the technical features of the present invention is introduced. For example, during the manufacture process in a factory, a mobile electronic device, such as a smart phone or a tablet PC, has fabricated, and an operator wants to enter the basic input/output system (BIOS) to set up a testing procedure before a boot process. In the case that the mobile electronic device is a laptop, the operator is able to enter the above-mentioned boot menu by pressing the F1/F2 button of the keyboard of the laptop.

However, the keyboard of the mobile electronic device, like a tablet PC, is usually set as a virtual keyboard displayed on a touch screen, and basically cannot be used before the mobile electronic device enters the operating system. Consequently, there is no button corresponding to the key value, i.e., the F1/F2 button, can be used for the said mobile electronic device. Therefore, in order to enter the boot menu of the mobile electronic device, like a tablet PC, before entering the operating system, the operator in the factory needs to connect the mobile electronic device, like a tablet PC, with a keyboard externally and then enters the foregoing boot menu by the external keyboard. This requires plenty of fixtures of keyboards and causes great inconvenience to the factory during the manufacture process.

Besides, during the manufacture process, the mobile electronic device, like a tablet PC, need to enter a multi-boot menu to select the preboot execution environment (PXE) to connect to servers in the factory by Internet, or select to use storage devices in accordance with the universal serial bus (USB) protocol. Nevertheless, similar to the problem mentioned above, there is no button corresponding to the key value of the F12 button can be used in the mobile electronic device like a tablet PC. At this time, if there is a physical button capable of being utilized and set as the function of the F12 button when the mobile electronic device is in a shutdown state in advance, then the operator of the factory can make the mobile electronic device enter the multi-boot menu of the BIOS boot menu when booting by pressing the physical button, or can further assign the read address when booting, like the above-mentioned USB storage devices and the case that using PXE to read by the Internet, by pressing this physical button when booting. Consequently, the expense and the preparation of the foregoing plenty of fixtures can be saved, and the complication for the operator during the manufacture process can be reduced.

Figure 1:
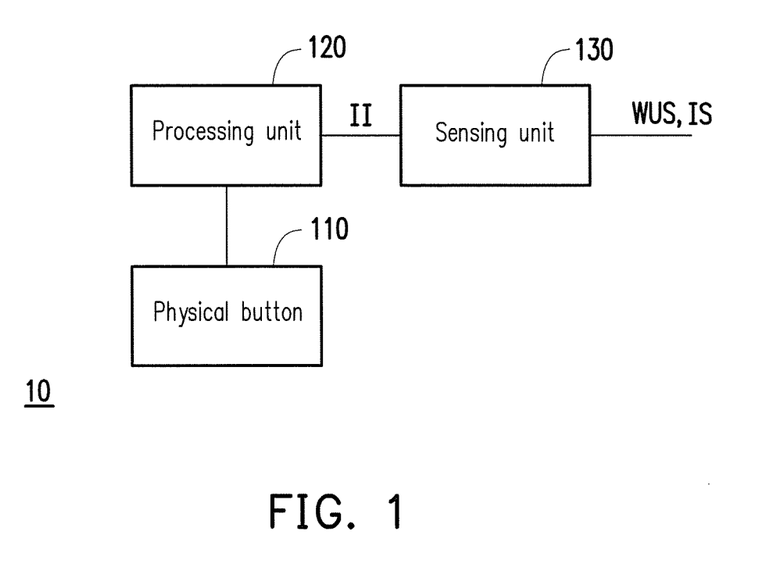
FIG. 1 is a block diagram illustrating an electronic device according to an embodiment of the present invention.

Therefore, in this invention, an electronic device, capable of making operators or users to change the corresponding functions of one or several physical buttons of the electronic device when the electronic device is in a shutdown state or in a hibernation mode, is provided. FIG. 1 is a block diagram illustrating an electronic device according to one embodiment of the invention. Referring to FIG. 1, the electronic device 10 includes a physical button 110, a processing unit 120 and a sensing unit 130. The processing unit 120 is coupled to the physical button 110 via a connecting interface such as a General Purpose I/O (GPIO). Herein, when the electronic device 10 enters a hibernation mode or is in a shutdown state, the sensing unit 130 continuously detects a wake-up signal WUS. When the sensing unit 130 receives the wake-up signal WUS, the sensing unit 130 wakes up the processing unit 120. The sensing unit receives an instruction signal IS externally, generates an instruction information II according to the instruction signal IS, and sends the instruction information II to the processing unit 120. When receiving the instruction information II, the processing unit 120 adjusts a corresponding function of the physical button 110 according to the instruction information II.

In the present embodiment, the electronic device 10 may be a mobile electronic device such as a smart phone, a tablet PC, and the like. In the embodiments of the invention, although it is mainly emphasized that changing the functions of a few physical buttons of a mobile electronic device without setting a physical keyboard, a mobile electronic device that sets with a physical keyboard may be still capable of using the technical solutions disclosed in the embodiments of the invention.

Herein, the above-mentioned hibernation mode may be any state of S1~S5 defined in the Advanced Configuration and Power Interface (ACPI), but the invention is not limited thereto. On the other hand, in the present embodiment, the processing unit 120 may be an embedded controller or a keyboard controller (KBC), and the technical solutions of the embodiments of the invention may be realized by directly using the general embedded controllers or keyboard controllers set in electronic devices in the prior art with different configurations. Though, in the present embodiment, the processing unit 120 may also be the central processing unit of the electronic device 10 or other operating circuits with special functions. That is, in the electronic device 10, any processing circuit with a calculating capability may be applied to be the processing unit 120 in the embodiments of the invention. In the case that the processing unit 120 is a central processing unit (CPU) in the electronic device 10, the processing unit 120 may be coupled to the physical button 110 by ways of other devices, and the embodiments mentioned above are not intended to limit the scope of the present invention.

Figure 2:
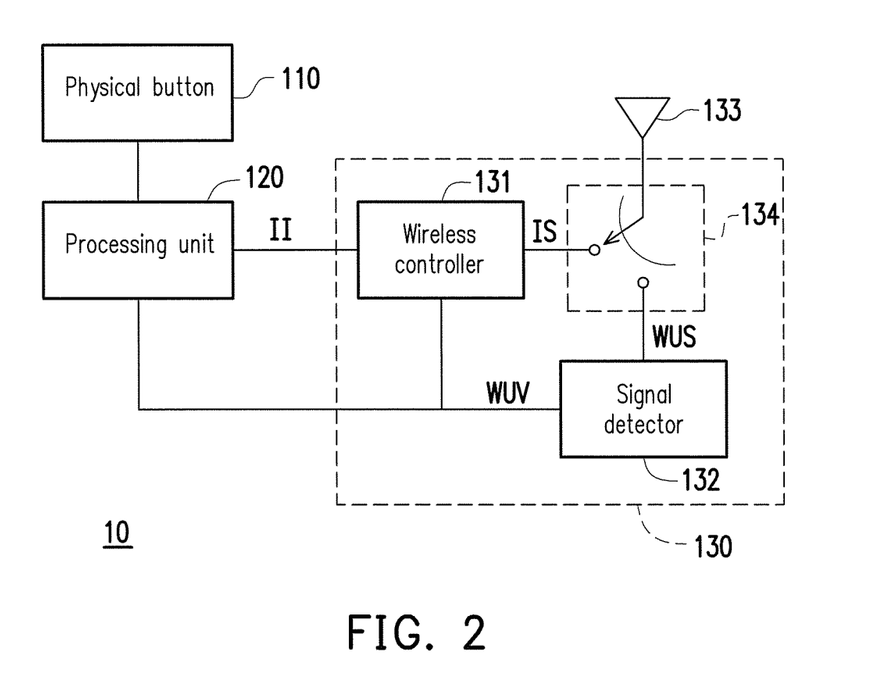
FIG. 2 is a block diagram illustrating an electronic device according to an embodiment of the present invention.

FIG. 2 is a block diagram illustrating an electronic device according to an embodiment of the present invention. In contrast to the embodiment illustrated in FIG. 1, a more detailed embodiment of the sensing unit 130 is illustrated in FIG. 2. The explanation of the coupling relationship among the physical button 110, the processing unit 120, and the sensing unit 130 can be referred to the embodiment illustrated in FIG. 1. Referring to FIG. 2, the sensing unit 130 includes a wireless controller 131, a signal detector 132, an antenna 133 and a switch 134. The wireless controller 131 is coupled to the processing unit 120 of the electronic device 10. The signal detector 132 is coupled to the wireless controller 131 and the processing unit 120. The switch 134 is coupled among the wireless controller 131, the signal detector 132 and the antenna 133, which selectively connect a path between the wireless controller 131 and the antenna 133, or a path between the signal detector 132 and the antenna 133. The wireless controller 131 or the processing unit 120 may control the switch 134 to switch and to connect the above-mentioned two paths by sending a control signal (the path for sending control signal is not shown in FIG. 2) to the switch 134.

For example, in this embodiment, when the electronic device 10 enters the hibernation mode or is in the shutdown state, the wireless controller 131 (or the processing unit 120) switches the switch 134 to connect the path between the antenna 133 and the signal detector 132. As a result, the signal detector 132 is capable of continuously detecting the wake-up signal WUS by the antenna 133 in the hibernation mode or in the shutdown state. When the signal detector 132 detects the wake-up signal WUS and receives the wake-up signal WUS by the antenna 133, the signal detector 132 wakes up the wireless controller 131 and the processing unit 120. For example, in the present embodiment, the signal detector 132 sends a wake-up voltage WUV, such as a high-level voltage, to the wireless controller 131 and the processing unit 120. When the wireless controller 131 and the processing unit 120 receive the wake-up voltage WUV, the wireless controller 131 and the processing unit 120 may restore operation by using a standby power.

When the signal detector 132 wakes up the wireless controller 131 and the wireless controller 131 (or the processing unit 120) restores operation, the wireless controller 131 (or the processing unit 120) switches the switch 134 to connect the path between the antenna 133 and the wireless controller 131. At this time, the wireless controller 131 which is waken up and restores operation is capable of receiving the instruction signal IS by antenna 133. When receiving the instruction signal IS, the wireless controller 131 generates the instruction information II according to the instruction signal IS, and sends the instruction information II to the processing unit 120.

The signal detector 132 may be any signal receiver. Since the signal detector 132 needs to detect signals continuously when the electronic device 10 is in the shutdown state or enters the hibernation mode, the signal detector 132 is preferred to be set as a low power signal receiver. In the present embodiment, signal detector 132 may be a passive radio frequency identification (RFID) tag, and the advantage of this disposition is that it is capable of detecting the wake-up signal WUS continuously without additional power supply. The wake-up signal WUS is a wireless radio frequency signal corresponding to the passive RFID, which is sent out by an active radio frequency identification device, such as an active RFID card, or by an electronic device having the capability to send the radio frequency signal with the same frequency band, like an electronic device having the capability of near field communication (NFC). However, the present invention is not limited to aforementioned implementation.

When the signal detector 132 receives the wake-up signal WUS by the antenna 133, the wake-up signal WUS triggers the signal detector 132. When the signal detector 132 is triggered, the signal detector 132 is capable of sending the wake-up voltage WUV to the wireless controller 132 and the processing unit 120 by using the energy of the wake-up signal WUS.

The wireless controller 131 may be a processing circuit capable of receiving wireless signals, modulating/demodulating and analyzing signals. In one embodiment of the present invention, the wireless controller 131 can receive the wireless radio frequency signal with the same frequency band as RFID similarly, and has the capability of processing and analyzing the wireless radio frequency signal. The instruction signal IS may be the wireless radio frequency signal with similarly frequency band as the wake-up signal WUS, which is sent by the signal sources same as the wake-up signal WUS or the signal sources different with the wake-up signal WUS, like the active RFID card or the mobile electronic devices having the capability of NFC, and so on. In one embodiment of the present invention, the instruction signal IS is further attached to the wake-up signal WUS. When waken up by the signal detector 132, the wireless controller 131 receives the wake-up signal WUS. After receiving the wake-up signal WUS, the wireless controller 131 processes and analyzes the wake-up signal WUS, and obtains the instruction signal IS from the wake-up signal WUS.

Figure 3:
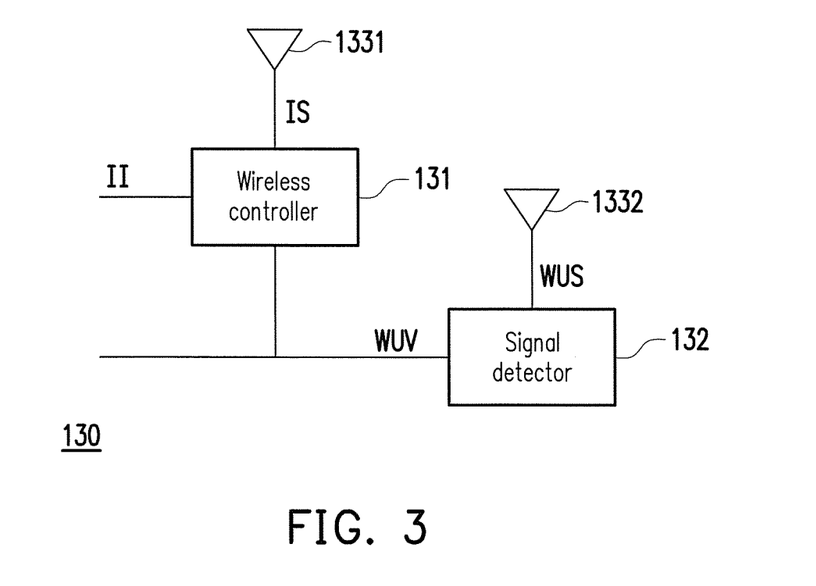
FIG. 3 is a block diagram illustrating a sensing unit according to an embodiment of the present invention.

The wireless controller 131 may be also configured to receive the wireless radio frequency signals with the frequency band different from that of the wake-up signal WUS, and the wireless radio frequency signals conforming to different communication protocols. In this situation, the antenna 133 needs to be configured to have the capability to receive/transmit the wireless radio frequency signals with the above-mentioned two frequency band (the frequency band of the wake-up signal WUS received by the signal detector 132, and the frequency band of the instruction signal IS received by the wireless controller 131). FIG. 3 is a block diagram illustrating a sensing unit according to an embodiment of the present invention. Referring to FIG. 3, in opposite to FIG. 2, the difference is that the frequency band of the wireless radio frequency signal received by the signal detector 132 (i.e., the frequency band of the wake-up signal WUS) is different from the frequency band of the wireless radio frequency signal received by the wireless controller 131 (i.e., the frequency band of the instruction signal IS), and the function of receiving the foregoing frequency bands may be incapable of integrated into an identical antenna (antenna 133 in FIG. 2, for example). Referring to FIG. 3, the sensing unit 130 further includes a first antenna 1331 coupled to the wireless controller 131, and a second antenna 1332 coupled to the signal detector 132. The signal detector 132 and the wireless controller 131 do not share the antenna with each other, but receive the wake-up signal WUS and instruction signal IS by the first antenna 1331 and the second antenna 1332, respectively. In the present embodiment, the signal detector 132 may be a passive RFID tag, and the wireless controller 131 may be a receiver which is capable of receiving the wireless radio frequency signal conforming to the Bluetooth protocol or the Wireless Fidelity (WiFi) protocol. However, the present invention is not limited to aforementioned implementation.

The wake-up signal WUS and the instruction signal IS may include several information and may be realized by several ways. A simple exemplary embodiment is illustrated as follows.

The signal format of the wake-up signal WUS and the instruction signal IS may be configured to include the following columns of information:

| Signal Type | Instruction Content | End Code |
| --- | --- | --- |

Each column may be expressed by a Byte, and the "End Code" may be simply set as 0 (and only a Byte of data content is occupied). Wherein, the column of "Signal Type" may be used to distinguish the type of signals. For instance, when the wake-up signal WUS and the instruction signal IS are both the wireless radio frequency signals with the RFID frequency band, "1" may be written in this column and may indicate the wake-up signal WUS; "2" may be written and may indicate the instruction signal IS; and "3" may be written and may indicate the wake-up signal WUS including the instruction signal IS.

In "Instruction Content", there would be different settings corresponding to the types of signals. For instance, when the type of signal is wake-up signal WUS ("Signal Type"=1), 0 or 1, which means non-wake-up and wake-up, may be written into the column of "Instruction Content". In general, the wake-up signal WUS may be expressed as follows for example:

| Signal Type | Instruction Content | End Code |
| --- | --- | --- |
| 1 | 1 | 0 |

When receiving the wireless radio frequency signal with the above-mentioned content, the signal detector 132 may recognize the wireless radio frequency signal as the wake-up signal WUS, and wakes up the processing unit 120 and the wireless controller 131 by using the energy of the wireless radio frequency signal.

On the other hand, if the type of the signal is the instruction signal IS ("Signal type"=2), the settings of key values may be included in the content of the instruction. For example, the content of the instruction includes a setting value, and the setting value corresponds to one of the corresponding functions of the physical button.

The corresponding relationship between the setting value and the corresponding function may be set in a mapping table in advance, and the mapping table may be pre-saved in an internal memory in the processing unit 120. When the wireless controller 131 receives the instruction signal IS, the wireless controller 131 obtains the setting value in the column of "Instruction Content" in the instruction signal IS, and sends the instruction information including the setting value to the processing unit 120. When receiving the instruction information including the setting value, the processing unit 120 saves the setting value in a column of the corresponding function of the physical button in the internal memory in the processing unit 120. If the physical button (e.g., the physical button 110 in FIG. 1) is pressed, the processing unit 120 finds out the corresponding function corresponding to the setting value by comparing the above-mentioned mapping table by applying a look-up table method according to the setting value, and executes the corresponding function (or sends the executing instruction to an internal device capable of executing the corresponding function in the electronic device 10).

In this example, the size of the column of "Instruction Content" is 1 byte, which means that there are 256 possible values (00~FF) for the setting value. However, the present invention is not limited to aforementioned implementation and the size of the column can be adjusted according to the actual requirement.

If the type of signals is the wake-up signal WUS including the instruction signal IS ("Signal type"=3), the content of the wireless radio frequency signal may be regarded as the wake-up signal WUS connecting with the instruction signal IS in series, and expressed as follows:

| Signal Type | Wake-Up | End Code | Key Value Setting | End Code |
|---|---|---|---|---|
| 3 | 1 | 0 | 01 | 0 |

If receiving the radio frequency signal, the signal detector 132 wakes up the processing unit 120 and the wireless controller 131 since the second column of the wireless radio frequency signal is 1. After waken up, the wireless controller 131 obtains the setting of the key value (01) in the fourth column of the wireless radio frequency signal as the setting value, and sends the instruction information II including the setting value to the processing unit 120, so that the processing unit 120 would be capable of adjusting the corresponding function of the physical button according to the setting value.

In addition, when the wireless controller 131 may be incapable of understanding the contents of the wireless radio frequency signal (like the wake-up signal WUS or instruction signal IS), the wireless controller 131 may send an error signal to the signal source to request the signal source to resend a wireless radio frequency signal. In this case, the wireless controller 131 may set the column of "Signal Type" as an identifying number corresponding to the error signal, like "4", so as to differentiate the error signal from the other types of the wireless radio frequency signals mentioned above.

The above-mentioned signal formats are only examples and can be adjusted according to the actual requirement. In addition to the foregoing content, the wake-up signal WUS and the instruction signal IS may include other parameters. For example, the instruction signal IS may attach parameters for the electronic device 10 executing the boot process, so that the wireless controller 131 would be capable of sending the instruction information II including the above-mentioned parameters to the processing unit 120 after receiving the instruction signal IS, and the processing unit 120 could be capable of directly using these parameters when executing the boot process next time (for example, used by BIOS or related drivers when the boot process is executed). For example, after performing an inspection procedure, the operator of the factory may use the instruction information II including the originally preset factory settings to make the electronic device 10 execute the boot process with the original settings when booting once again after manufacture, without entering the setting screen of BIOS to restore the factory settings again when booting. However, the present invention is not limited to aforementioned implementation On the other hand, there are several possible cases for the corresponding function of the physical button 110. One is the key value corresponding to a keyboard, which approaches the corresponding effect when the electronic device 10 executes the boot process or when the operating system of the electronic device 10 operates. For instance, the physical button 110 may be set as F1, F2 or F12, allowing a user to long press the physical button to enter the boot menu or the multi-boot menu when using the electronic device 10 to execute the boot process. Another example is that the physical button 110 may be set as the CTRL key on the keyboard, which is convenient for the user to multiply select objects on the display screen simultaneously when the operating system of the electronic device 10 operates. Although all the above-mentioned exemplary embodiments are illustrated with the electronic device 10 including a physical button (e.g., the physical button 110), the corresponding function of every physical button may still be adjusted according to the aforementioned implementation when the electronic device 10 includes more than one physical button.

The corresponding function may also include an operation process of rapidly booting the electronic device 10. For example, the physical button may be long pressed to make the operating system boot rapidly or silently when the electronic device 10 boots. Besides, like the case that substituting the shortcut keys set on laptops, the corresponding function may corresponds to turning on/off the WiFi module, the Bluetooth module or the backlight module, or the like.

Additionally, the corresponding function may also include adjusting the operating mode of the electronic device 10. For instance, when operating the electronic device 10 to execute the boot process, the user long press the physical button, which results in the electronic device 10 operating the operating system in a powering saving mode or a temperature control mode, and limits the maximum backlight lightness of the electronic device 10, the maximum operating clock of the processor, the multiplexing capability of the processor, the management of charging efficiency of the power module, and so on. Although these operation modes of the electronic device 10 may be updated by firmwares after entering the operating system or may be set by the user utilizing the input/output interface like touch screens, these settings may often be applied after rebooted. If the technical solutions of this invention is used, the user may only need to press the physical button 110 when the boot process is executed, so as to prevent the complication with the reboot process.

Figure 4:
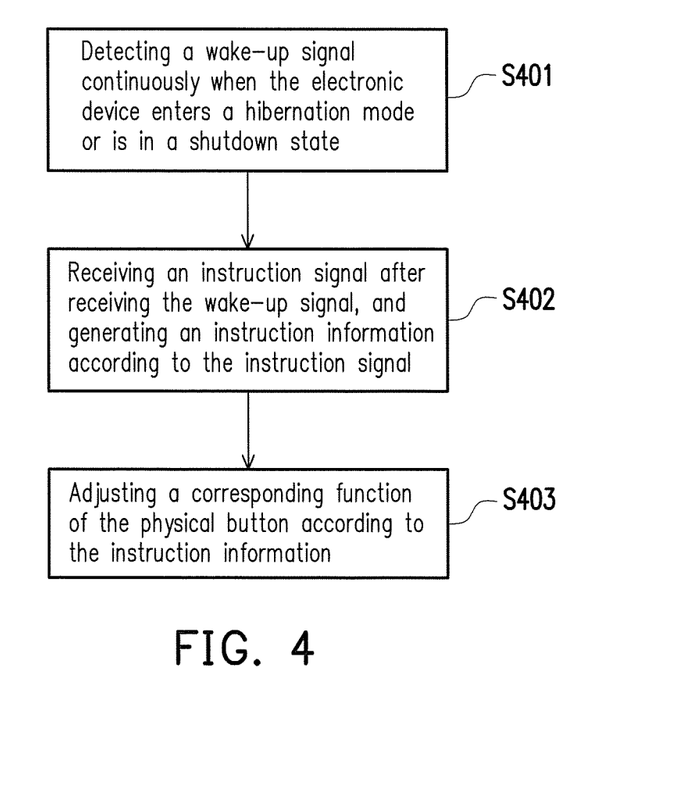
FIG. 4 is a flowchart illustrating a control method according to an embodiment of the present invention.

A control method is also provided in this invention, which is adapted to an electronic device including a physical button. FIG. 4 is a flowchart illustrating a control method according to an embodiment of the present invention. Referring to FIG. 4, in step S401 at first, when the electronic device enters a hibernation mode or is in a shutdown state, a wake-up signal is detected continuously. Next, in step S402, after the wake-up signal is received, an instruction signal is received, and an instruction information is generated according to the instruction signal. Then, in step S403, a corresponding function of the physical button is adjusted according to the instruction information. The detailed implementations of the steps S401-S403 of the control method can be referred to descriptions of the embodiments illustrated in FIG. 1 to FIG. 3 and will not be described herein.

As described above, the present invention provides an electronic device and a control method thereof, which includes the following advantages. For example, After the electronic device is fabricated in the factory, every production line in the factory may set one or more active RFID cards or active RFID transmitter according to the setting and testing needed for each production line, and change the corresponding function of the physical button when the electronic device is still in the shutdown state (or in the hibernation mode) by sending the wake-up signal, instruction signal or combinations thereof. As a result, operators of the production line may avoid the processes such as repeatedly connecting input/output devices like keyboards, repeatedly boot/shutdown, and the like. In addition, another active FRID card or another active transmitter may be set at the end of the production line to restore the adjustment of the corresponding function previously, or even to attach original setting parameters to the instruction signal IS, so as to restore the electronic device 10 to be with the original factory settings when the boot process is executed next time.

On the other hand, for the user, the corresponding function of the physical button may be changed by the active RFID card (for example, attached with the electronic device to the user after manufacture) or by using the mobile electronic devices having the capability of NFC (like smart phones) to execute the corresponding programs, so as to allow users to change the corresponding function of the physical button or adjust the modes and parameters of the system when the electronic device is in the hibernation mode or in the shutdown state, and without rebooting to apply new settings. Furthermore, the user is able to change the settings of the physical button according to his/her habits, which makes the electronic device convenient for use when the operation system is operated, and thereby the using experience of the electronic device can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   an antenna;
   a physical button, configured to have a first function and preset with a first key value corresponding to a first function of the electronic device, wherein the first function of the electronic device is executed when the physical button being pressed;
   a processing unit, coupled to the physical button; and
   a sensing unit, coupled to the processing unit and the antenna, the sensing unit comprises:
      a wireless controller, coupled to the processing unit; and
      a signal detector, coupled to the wireless controller and the processing unit,
   wherein, when the electronic device enters a hibernation mode or is in a shutdown state, the sensing unit continuously detects a wake-up signal;
   when the signal detector receives, through the antenna, the wake-up signal, the signal detector wakes up the wireless controller and the processing unit;
   when the wireless controller is waken up by the signal detector, the wireless controller receives, through the antenna, externally an instruction signal which includes a second key value corresponding to a second function of the electronic device, generates an instruction information according to the instruction signal, and sends the instruction information to the processing unit, wherein the instruction information defines the second function, and the second function comprises entering a boot menu or a multi-boot menu of a boot process of the electronic device;
   when the processing unit receives the instruction information, the processing unit changes function of the physical button of the electronic device from the first function to the second function by changing key value of the physical button from the first key value to the second key value; and
   when the physical button having the second function is pressed, the processing unit executes the second function to enter the boot menu or the multi-boot menu.

2. The electronic device according to claim 1, wherein the sensing unit further comprises:
   a switch, coupled among the wireless controller, the signal detector and the antenna,
   wherein, when the electronic device enters the hibernation mode or is in the shutdown state, the wireless controller switches the switch to connect a path between the antenna and the signal detector; and
   when the signal detector wakes up the wireless controller, the wireless controller switches the switch to connect the path between the antenna and the wireless controller.

3. The electronic device according to claim 1, wherein the sensing unit further comprises:
   a switch, coupled among the wireless controller, the signal detector and the antenna,
   wherein, when the electronic device enters the hibernation mode or is in the shutdown state, the processing unit switches the switch to connect a path between the antenna and the signal detector; and
   when the signal detector wakes up the processing unit, the processing unit switches the switch to connect a path between the antenna and the wireless controller.

4. The electronic device according to claim 1, wherein the antenna comprises a first sub-antenna and a second sub-antenna, and the sensing unit further comprises:
   the first sub-antenna, coupled to the wireless controller; and
   the second sub-antenna, coupled to the signal detector,
   wherein, when the signal detector receives the wake-up signal from the second sub-antenna, the signal detector wakes up the wireless controller and the processing unit; and
   when the wireless controller is waken up, the wireless controller receives the instruction signal through the first sub-antenna.

5. The electronic device according to claim 1, wherein:
   the signal detector is a passive radio frequency identification tag,
   wherein when the signal detector receives the wake-up signal, the wake-up signal triggers the signal detector; and
   when the signal detector is triggered, the signal detector sends a wake-up voltage to the wireless controller and the processing unit.

6. The electronic device according to claim 1, wherein:
   when the wireless controller is incapable of generating the instruction information according to the instruction signal, the wireless controller generates an error signal and sends the error signal.

7. The electronic device according to claim 1, wherein:
   the instruction signal is attached to the wake-up signal; and
   the sensing unit receives the wake-up signal, and obtains the instruction signal from the wake-up signal.

8. The electronic device according to claim 1, wherein:
   The processing unit is an embedded controller or a keyboard controller.

9. The electronic device according to claim 1, wherein: the processing unit is a central processing unit.

10. The electronic device according to claim 1, wherein: the instruction information comprises a setting value, and when receiving the instruction information, the processing unit saves the setting value in an internal memory of the processing unit,
wherein, when the physical button is pressed, the processing unit activates the second function of the physical button according to the setting value by applying a look-up table method.

11. The electronic device according to claim 1, wherein: the instruction information further comprises a plurality of setting parameters, and when receiving the instruction information, the processing unit saves the setting parameters in an internal memory of the processing unit,
wherein, when rebooted, the electronic device executes a boot process according to the setting parameters.

12. The electronic device according to claim 1, wherein: the second function further comprises an operation process of rapidly booting the electronic device.

13. The electronic device according to claim 1, wherein: the second function further comprises entering a power saving mode or a temperature control mode of the electronic device.

14. A control method, adapted to an electronic device comprising a physical button having a first function, wherein the physical button is preset with a first key value corresponding to a first function of the electronic device, wherein the first function of the electronic device is executed when the physical button being pressed, the control method comprising:
detecting a wake-up signal continuously when the electronic device enters a hibernation mode or is in a shutdown state;
receiving, through an antenna of the electronic device, externally an instruction signal which includes a second key value corresponding to a second function of the electronic device after receiving the wake-up signal through the antenna, and generating an instruction information according to the instruction signal, wherein the instruction information defines the second function, and the second function comprises entering a boot menu or a multi-boot menu of a boot process of the electronic device; and
changing function of the physical button from the first function to the second function by changing key value of the physical button from the first key value to the second key value,
wherein when the physical button having the second function is pressed, executing the second function to enter the boot menu or the multi-boot menu.

15. The control method according to claim 14, wherein: generating an error signal and sending the error signal when the wireless controller is incapable of generating the instruction information according to the instruction signal.

16. The control method according to claim 14, wherein the instruction signal is attached to the wake-up signal, the step of receiving the instruction signal comprising:
receiving the wake-up signal and obtaining the instruction signal from the wake-up signal.

17. The control method according to claim 14, wherein the instruction information comprises a setting value, the step of changing the function of the physical button to be the second function defined by the instruction information comprising:
saving the setting value; and
when the physical button is pressed, activating the second function of the physical button according to the setting value by applying a look-up table method.

18. The control method according to claim 14, wherein the instruction information comprises a plurality of setting parameters, the control method further comprising:
saving the setting parameters,
wherein, when rebooted, the electronic device executes a boot process according to the setting parameters.

19. The control method according to claim 14, wherein: the second function further comprises an operation process of rapidly booting the electronic device.

20. The control method according to claim 14, wherein: the second function further comprises entering a power saving mode or a temperature control mode of the electronic device.

21. An electronic device, comprising:
an antenna;
a physical button, configured to have a first function and preset with a first key value corresponding to a first function of the electronic device, wherein the first function of the electronic device is executed when the physical button being pressed;
a processing unit, coupled to the physical button; and
a sensing unit, coupled to the processing unit and the antenna, the sensing unit comprises:
a wireless controller, coupled to the processing unit; and
a signal detector, coupled to the wireless controller and the processing unit,
wherein, when the electronic device enters a hibernation mode or is in a shutdown state, the sensing unit continuously detects a wake-up signal;
when the signal detector receives, through the antenna, the wake-up signal, the signal detector wakes up the wireless controller and the processing unit;
when the wireless controller is waken up by the signal detector, the wireless controller receives, through the antenna, externally an instruction signal which includes a second key value corresponding to a second function of the electronic device, generates an instruction information according to the instruction signal, and sends the instruction information to the processing unit, wherein the instruction information defines the second function, and the second function comprises turning on and turning off a WiFi module or a Bluetooth module of the electronic device;
when the processing unit receives the instruction information, the processing unit changes function of the physical button of the electronic device from the first function to the second function by changing key value of the physical button from the first key value to the second key value; and
when the physical button having the second function is pressed, the processing unit executes the second function to turn on or turn off a WiFi module or a Bluetooth module of the electronic device.

22. A control method, adapted to an electronic device comprising a physical button having a first function, wherein the physical button is preset with a first key value corresponding to a first function of the electronic device, wherein the first function of the electronic device is executed when the physical button being pressed, the control method comprising:

detecting a wake-up signal continuously when the electronic device enters a hibernation mode or is in a shutdown state;
   receiving, through an antenna of the electronic device, externally an instruction signal which includes a second key value corresponding to a second function of the electronic device after receiving the wake-up signal through the antenna, and generating an instruction information according to the instruction signal, wherein the instruction information defines the second function, and the second function comprises turning on and turning off a WiFi module or a Bluetooth module of the electronic device; and
   changing function of the physical button from the first function to the second function by changing key value of the physical button from the first key value to the second key value,
   wherein when the physical button having the second function is pressed, executing the second function to turn on and turn off a WiFi module or a Bluetooth module of the electronic device.

23. An electronic device, comprising:
   an antenna;
   a physical button, configured to have a first function and preset with a first key value corresponding to a first function of the electronic device, wherein the first function of the electronic device is executed when the physical button being pressed;
   a processing unit, coupled to the physical button; and
   a sensing unit, coupled to the processing unit and the antenna, the sensing unit comprises:
      a wireless controller, coupled to the processing unit; and
      a signal detector, coupled to the wireless controller and the processing unit,
   wherein, when the electronic device enters a hibernation mode or is in a shutdown state, the sensing unit continuously detects a wake-up signal;
   when the signal detector receives, through the antenna, the wake-up signal, the signal detector wakes up the wireless controller and the processing unit;
   when the wireless controller is waken up by the signal detector, the wireless controller receives, through the antenna, externally an instruction signal which includes a second key value corresponding to a second function of the electronic device, generates an instruction information according to the instruction signal, and sends the instruction information to the processing unit, wherein the instruction information defines the second function, and the second function comprises operating the electronic device in a power saving mode or a temperature control mode rather than a normal mode when the electronic device executes a boot process;
   when the processing unit receives the instruction information, the processing unit changes function of the physical button of the electronic device from the first function to the second function by changing key value of the physical button from the first key value to the second key value; and
   when the electronic device executes the boot process and the physical button is pressed, the processing unit executes the second function to operate the electronic device in the power saving mode or the temperature control mode.

24. A control method, adapted to an electronic device comprising a physical button having a first function, wherein the physical button is preset with a first key value corresponding to a first function of the electronic device, wherein the first function of the electronic device is executed when the physical button being pressed, the control method comprising:

detecting a wake-up signal continuously when the electronic device enters a hibernation mode or is in a shutdown state;
   receiving, through an antenna of the electronic device, externally an instruction signal which includes a second key value corresponding to a second function of the electronic device after receiving the wake-up signal through the antenna, and generating an instruction information according to the instruction signal, wherein the instruction information defines the second function, and the second function comprises operating the electronic device in a power saving mode or a temperature control mode rather than a normal mode when a boot process of the electronic device is executed; and
   changing function of the physical button from the first function to the second function by changing key value of the physical button from the first key value to the second key value,
   wherein the physical button is pressed during the execution of the boot process of the electronic device, executing the second function to operate the electronic device in the power saving mode or the temperature control mode.

* * * * *